United States Patent [19]

Chen et al.

[11] 4,194,964
[45] Mar. 25, 1980

[54] CATALYTIC CONVERSION OF HYDROCARBONS IN REACTOR FRACTIONATOR

[75] Inventors: Nai Y. Chen, Titusville, N.J.; Ikai Wang, Hsinchu, Taiwan

[73] Assignee: Mobil Oil Corporation, New York, N.Y.

[21] Appl. No.: 922,915

[22] Filed: Jul. 10, 1978

[51] Int. Cl.² .................... C10G 13/02; C10G 37/06; C10G 23/02
[52] U.S. Cl. ................... 208/108; 203/DIG. 6; 203/28; 208/59; 208/89; 208/103; 208/146; 208/166; 208/213
[58] Field of Search .................... 208/108–112, 208/58, 59, 148, 89, 213, 216, 166, 146; 203/28

[56] References Cited

U.S. PATENT DOCUMENTS

| | | | |
|---|---|---|---|
| 2,741,582 | 4/1956 | Evans et al. | 208/166 |
| 3,091,586 | 5/1963 | Pappas et al. | 208/210 |
| 3,124,526 | 3/1964 | Butler et al. | 208/264 |
| 3,173,858 | 3/1965 | McClure | 208/148 |
| 3,186,935 | 6/1965 | Vaell | 208/59 |
| 3,211,641 | 10/1965 | Halik et al. | 208/59 |
| 3,425,810 | 2/1969 | Scott | 208/210 X |
| 3,634,535 | 1/1972 | Haunschild | 203/28 X |

Primary Examiner—Delbert E. Gantz
Assistant Examiner—G. E. Schmitkons
Attorney, Agent, or Firm—Charles A. Huggett; Raymond W. Barclay

[57] ABSTRACT

Heavy petroliferous stocks such as vacuum and atmospheric resids, tar sand oils, shale oils, liquids from conversion of coal and the like are concurrently distilled and hydroprocessed for removal of sulfur, nitrogen and metals and are hydrocracked or otherwise hydroprocessed in a packed distillation column under hydrogen pressure wherein the packing is constituted, at least to a substantial extent in both stripping and rectifying sections by catalyst suited to the desired conversions.

8 Claims, 2 Drawing Figures

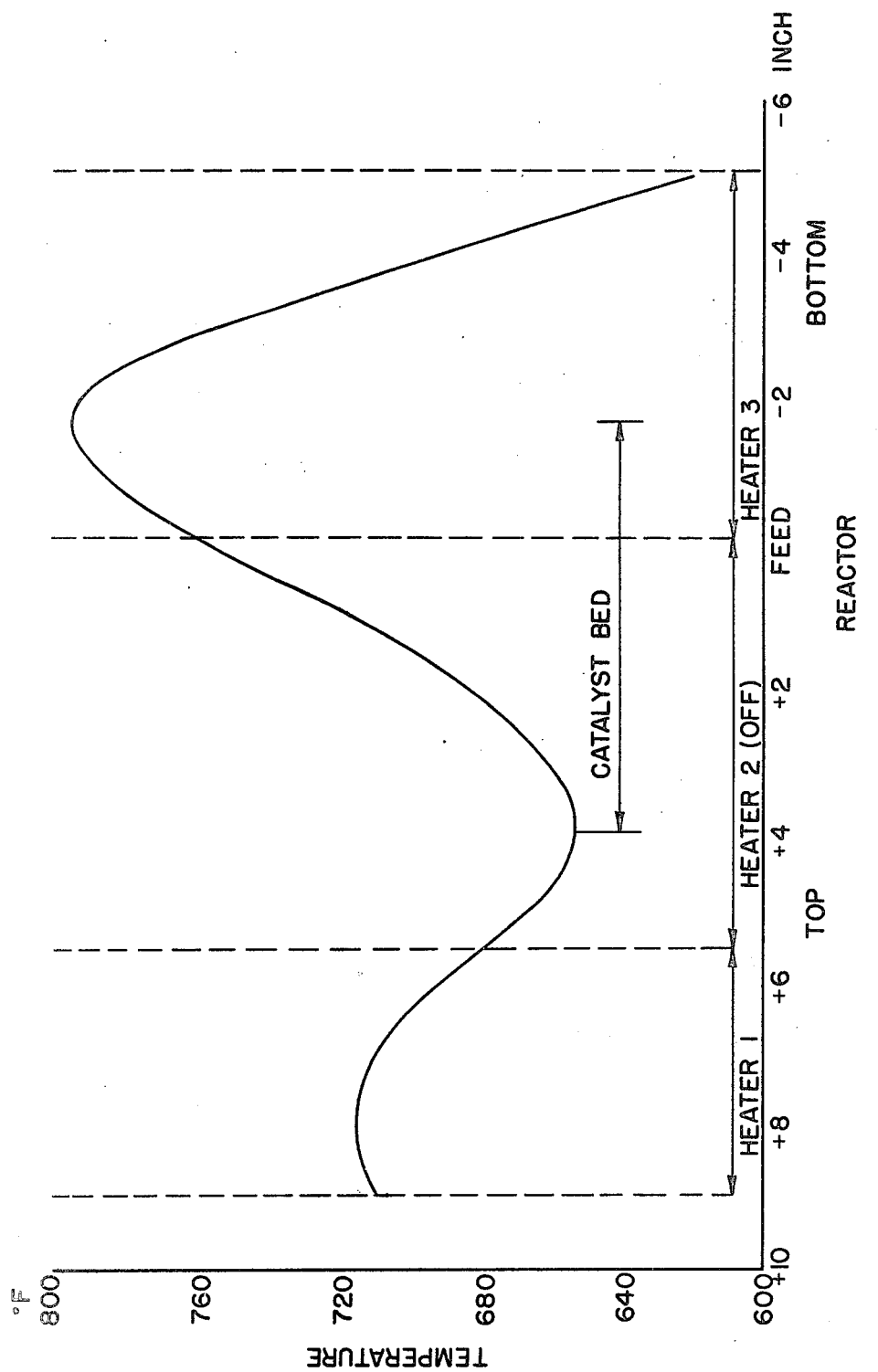

CATALYTIC CONVERSION OF HYDROCARBONS IN REACTOR FRACTIONATOR

FIELD OF THE INVENTION

The invention is concerned with conversion of heavy hydrocarbon stocks, particularly those containing sulfur, nitrogen and metal contaminants to provide good yields of such premium products as motor gasoline, diesel fuel, jet fuel, distillate fuel oil and kerosene. Such premium products are of lower boiling point (lower molecular weight) than the constituents of the heavy ends remaining after separation by distillation of the naturally occuring fractions suited to use in blending or other formulations of the premium products. The necessary reduction in boiling point of the constituents of the heavy stocks is generally accomplished commercially by catalytic cracking or by hydrocracking to lower molecular weight materials. In addition, the sulfur content of heavy fractions from many crudes exceeds environmentally acceptable limits. That feature is usually handled by hydrodesulfurization, a catalytic reaction under hydrogen pressure in the presence of a catalyst having hydrogenation/dehydrogenation activity such as cobalt and molybdenum oxides or sulfides on a refractory support such as alumina.

Nitrogen and metal compounds are also concentrated in the heavier stocks. These are detrimental to the activity of catalysts employed in processing of the fractions derived from heavy ends. Nitrogen compounds yield ammonia which impair the activity of catalysts for cracking, hydrocracking and reforming. Metals tend to deposit on cracking catalysts. Since the latter are employed without added hydrogen, the metals deposited from cracking of heavy petroleum fractions, primarily nickel and vanadium, result in undue conversion of cracking charge to coke and hydrogen. This not only reduces the yield of gasoline but also leads to overloading of coke burning facilities and overloading of the downstream "gas plant" for processing of the light gaseous by-products of catalytic cracking.

Similar considerations apply to the heavy fractions obtained by extraction of liquid hydrocarbons from oil shale by heating and to heavy coal liquids such as solvent refined coal (SRC). The invention contemplates treatment of all such materials.

BACKGROUND OF THE INVENTION

In order to avoid the processing problems and to meet product quality specifications as mentioned above, it is common practice to hydrotreat various stocks for removal of sulfur, nitrogen and metals. For example, feed for hydrocracking may be first contacted with a hydrotreating catalyst in the presence of hydrogen. The hydrotreater effluent is condensed and separated from unused hydrogen, ammonia, hydrogen sulfide and gaseous hydrocarbons such as methane for recycle to the reactor after scrubbing to remove hydrogen sulfide and ammonia. The condensate is then mixed with a further supply of hydrogen and passed through one or more beds of hydrocracking catalyst to produce products of lower boiling range than the feed. Typically, the hydrocracker is a series of beds in a vertical reactor and the charge is passed downward in concurrent flow with hydrogen. The reactions taking place are exothermic, resulting in a temperature rise in each bed. Temperature is controlled by addition of cold hydrogen between the beds.

It will be seen that the conventional hydrocracker is a multi-stage operation of first stage pretreater and second stage hydrocracker with similar reactions taking place in both stages, but to different relative degrees. In the first stage, the predominant reactions are desulfurization, denitrogenation and demetallation with a lesser degree of cracking. The high pressure separator to provide a recycle hydrogen stream will remove methane but, for the most part, other cracked products will be retained in the feed to the hydrocracker. In the latter stage, the predominant reaction is cracking, applied alike to heavy components and to potential gasoline components derived from cracking in the first stage. Such nitrogen and sulfur compounds as remain after the first stage will be subjected to conversion reactions for removal of these contaminants.

In an effort to reduce the capital cost and operating expense of multi-stage operation, it has been proposed that the first stage (pretreater) effluent be cascaded to the second stage. This results in supply to the hydrocracker of all components of the first stage effluent.

An interesting variant on hydrotreating residual stocks is described in Franz et al. U.S. Pat. No. 3,897,329. The feed is introduced to a region intermediate two beds of cobalt-moly on alumina catalyst. Hydrogen is added with the feed. In addition, hydrogen is supplied to the bottom of the lower bed to pass countercurrent to liquid hydrocarbons flowing down through the bed. In that lower bed, desulfurization takes place at about 850° F. Vaporous products from reaction in the lower bed and those present in the charge pass up into the upper bed together with hydrogen and are there further reacted at the higher temperature of 875° F. The higher temperature in the upper bed will be effective to avoid condensation in that upper bed and return of reflux to the lower bed. As pointed out in the patent, it is not necessary that the two beds be in the same chamber, only that there be conduit means for conveying vapor and hydrogen from the lower bed to the upper bed. In effect, these patentees are providing for more severe reaction conditions (higher temperature and greater hydrogen concentration) applied to the vapor phase charge in the upper bed.

In essence, the Franz et al. patent describes a method of connecting a concurrent vapor phase reactor with a countercurrent trickle bed or mixed phase reactor without interstage separation.

Another form of multiple bed hydrotreating with intermediate supply of charge is found in Pappas et al. U.S. Pat. No. 3,091,586. Contrary to the effects of Franz et al., the Pappas et al. system provides for greatest severity of treatment for the liquid fraction which passes downwardly through three successive catalyst beds. Overcracking of vaporous products formed in any of these beds is avoided by withdrawal of the gas phase from a space above each bed. As a consequence, a fresh supply of hydrogen must be introduced to the bottom of each such bed. A somewhat similar effect is obtained in Scott, Jr. U.S. Pat. No. 3,425,810 by multiple feed and withdrawal conduits in a multi-bed hydrotreater. See also Halik et al. U.S. Pat. No. 3,211,641.

The Pappas et al. patent describes a method of connecting several countercurrent trickle bed reactors with a concurrent vapor phase reactor in the hydrofining of shale oil. Means are provided between reactors to allow the addition of hydrogen and the withdrawal of vaporous products and to conduct liquid flowing from one reactor to the reactor below. It is noted that the vaporous product from one reactor is not fed to the next reactor. Other than the specific mechanical connections, the system is not different from an installation of multistage reactors all placed on the ground level.

Scott's hydrotreating apparatus is basically a series of countercurrent flow reactors stacked vertically, with provisions for adding and withdrawing vapor and liquid streams from each reactor.

The fact that the reactors are stacked vertically does not differ in principle from multistage reactors on the ground level except that interstage circulation pumps must be provided for the ground level facility.

The Halik et al. patent describes the addition to a multistage-reactor system, of a confined saturation zone to dissolve hydrogen in the liquid feedstock and a lift tube which allows the liquid reactant to be recycled from the bottom of the reactor to the top of the reactor with a gaseous reactant stream (hydrogen).

Greater severity of treatment for the liquid portion of a hydrofining charge is provided in Wilson et al. U.S. Pat. No. 3,658,681. That system puts the charge through vacuum distillation to yield a vacuum overhead fraction passed downwardly through a top bed of a reactor to mix with the product of passing the vacuum bottoms upwardly through three beds of catalyst. The combined effluent is withdrawn as a single product stream. Although the Wilson et al. arrangement does afford the advantage of greater severity of treatment for the fraction needing the greater severity, it achieves that result in a rather cumbersome style, involving a pretreatment vacuum distillation and a post-treatment distillation to separate distillate and residual fuels.

SUMMARY OF THE INVENTION

It has now been demonstrated that a hydrotreater/hydrocracker combination can be so operated that it functions as distillation column as well as a reactor to discharge separate distillate and residual fractions. The system of this invention provides a temperature gradient similar to that of a distillation column, maximum temperature in the bottom, thus affording maximum severity of treatment for the heavy fraction of the charge.

The charge to the process is introduced to an intermediate point in the packed column, such that a substantial portion of catalyst constitutes packing both above and below the feed point. The distillation column need not be packed only with catalysts. Catalysts may be deposited as a coating on conventional packing materials such as Raschig rings, etc. The packaging may be interspaced with bubblecap plates or perforated plates. See FIG. 1. Temperature control along the length of the column is maintained at the desired gradient values by cooled reflux to the top of the column and circulation of liquid from the bottom through a heat exchanger. Hydrogen passes upwardly through the column to supply that reactant and to act as a stripping medium to aid the distillation function conducted concurrently with hydrotreating, hydrocracking and the like.

Thus the invention provides a process for simultaneous distillation and hydroprocessing of heavy hydrocarbon feed stocks which comprises introducing said stocks to an intermediate point in a vertical column of a hydroprocessing catalyst on a porous solid support, introducing hydrogen to said column below said intermediate point for flow upwardly in said column, maintaining a temperature gradient in said column from a maximum below said intermediate point to a minimum thereabove whereby higher boiling constituents of said stocks are caused to flow downwardly as liquid countercurrent to said hydrogen at conversion conditions while lighter constituents and conversion products are caused to flow upwardly as vapor concurrent with said hydrogen resulting in fractional distillation of feed stocks and conversion products in said column, withdrawing liquid hydrocarbon products from the bottom of said column, withdrawing distillate hydrocarbon product vapor from the top of said column, condensing said product vapor and recycling such condensed liquid product as reflux to the top of said column for temperature control. The process is suited to treatment of heavy stocks generally, such as gas oil, crude petroleum, residual fractions from distillation of petroliferous crudes and waxy crude petroleum stocks.

BRIEF DESCRIPTION OF THE DRAWINGS

The objects and advantages will be further understood from the description of specific embodiments below when considered in connection with the annexed drawings wherein:

FIG. 2 is a graphical illustration of the temperature profile in a laboratory scale reactor obtained during an experimental run according to the invention.

DESCRIPTION OF SPECIFIC EMBODIMENTS

Figure 1:
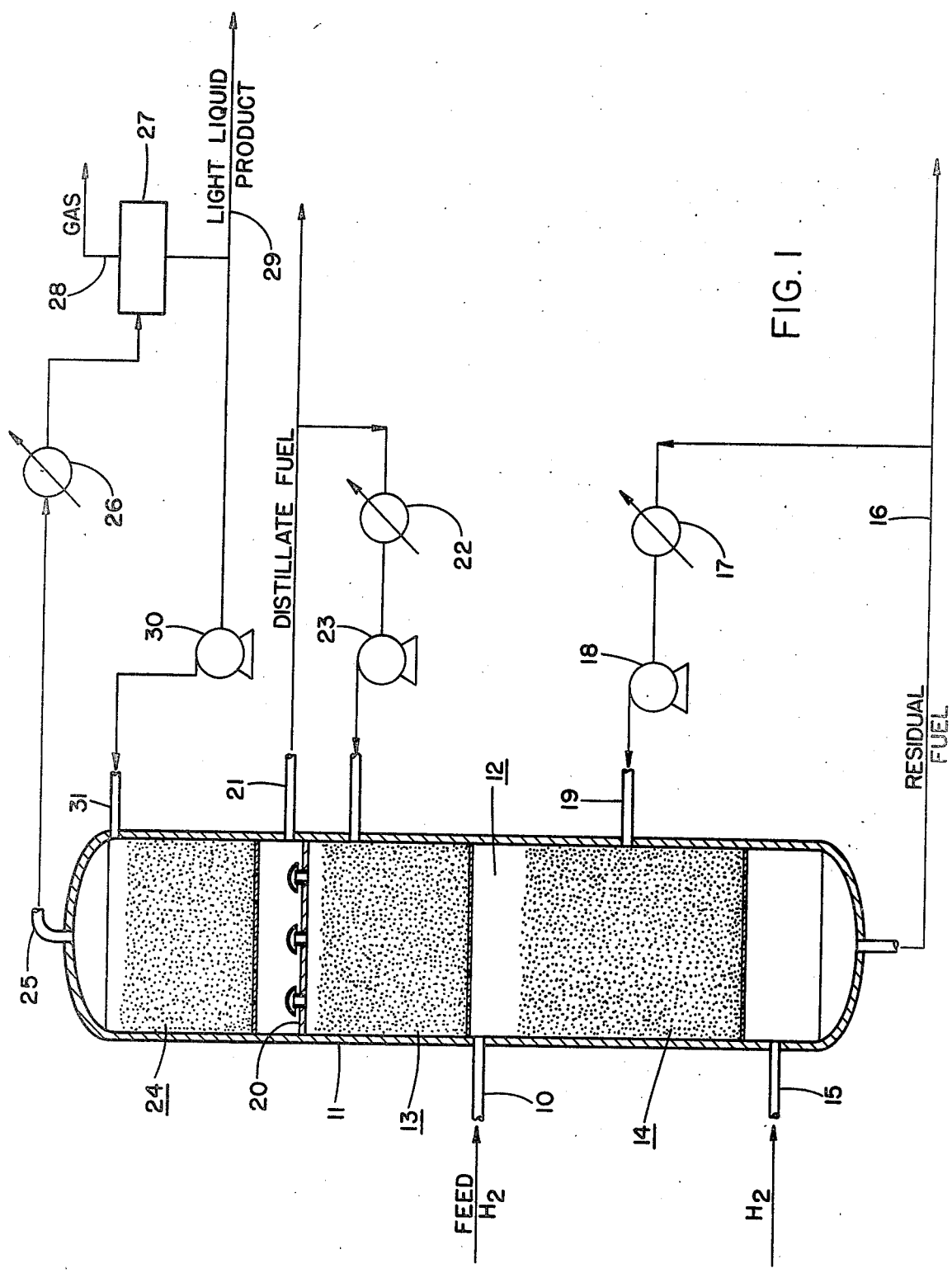
FIG. 1 is a partially diagrammatic view in vertical section of apparatus for practicing an embodiment of the invention.

In one embodiment, the present process provides means for accomplishing the functions of a vacuum distillation tower concurrently with the functions of a hydrocracker including the first stages of hydrocracker downstream fractionation and together with a treater for desulfurization of vacuum tower bottoms. Because the distillation function is conducted under hydrogen pressure in the presence of a catalyst having hydrogenation/dehydrogenation metal components, coking is inhibited. During distillation, catalytic hydrocracking and other catalytic reactions with hydrogen are conducted, notably desulfurization, denitrogenation and demetallation. By suitable choice of catalysts, the added functions of catalytic hydrodewaxing may also be conducted at the same time, e.g., by zeolite ZSM-5 combined with metal.

These results are achieved by providing a vertical column of suitable catalyst and supplying the oil to be treated at a level in the catalyst intermediate the upper and lower boundaries of catalyt while passing hydrogen upwardly through the catalyst.

The reactions occuring are exothermic, requiring that cooling be applied at intermediate portions of the bed or beds of catalyst to maintain the temperature gradient needed for fractional distillation. A suitable arrangement of reactor/fractionator is illustrated in FIG. 1 for treating atmospheric column bottoms derived from the usual crude fractionator normally employed as the first stage of a refinery operation to separate crude petroleum into several fractions for further treatment. The bottoms of the atmospheric pressure column, often called atmospheric residual stock or "resid" constitute a heavy fraction in which contaminants may be concentrated. The atmospheric tower is operated at temperatures below those at which thermal cracking may occur whereby the bottoms fraction is at a temperature in the general neighborhood of 650° F.

A 650° F.+fraction of that nature is the feed supplied by line 10 to reactor 11 of FIG. 1. Feed from line 10 is distributed across a plenum space 12 between catalyst bed 13 above and catalyst bed 14 below the feed point by spargers or other distributors, not shown, all as well known in the art. The fresh feed so introduced contacts hot vapors and gases rising from catalyst bed 14 and is thereby heated to a desired reaction temperature.

Liquid from the feed, together with some condensed heavy ends of the vapor rising from catalyst bed 14, flow downwardly through catalyst bed 14 countercurrent to a rising stream of hydrogen introduced at inlet 15 admixed with gaseous products of reaction in bed 14. The catalyst in bed 14 may be a hydrocracking catalyst such as palladium on silica-alumina or a hydrotreating catalyst such as cobalt/molybdenum on alumina. The amount of heat generated in bed 14 will be related to severity of reaction in that bed, governed in known manner by catalyst character, pressure, temperature and partial pressure of hydrogen. In any event, gaseous products will be generated, including light hydrocarbons, hydrogen sulfide, ammonia. Thus treated heavy ends flow from the bottom of catalyst bed 14 to accumulate in the lower portion of reactor 11 as desulfurized heavy fuel which is withdrawn at line 16. A portion of the bottoms may be recycled through heat exchanger 17, pump 18 and inlet line 19 to a mid-point of catalyst bed 14 through spargers or the like, not shown. Operation of heat exchanger 17 will be controlled to maintain a desired temperature in bed 14 having regard to extent of heat generation in that bed.

The stripping action of hydrogen passing upwardly through catalyst bed 14 may be augmented without increasing hydrogen partial pressure by adding steam or other inert gas, e.g., methane, with the hydrogen at inlet 15. As these gases rise through bed 14, lighter components of the down-flowing hydrocarbons are vaporized and passed from zone 14 of catalytic reaction at maximum temperature and hydrogen pressure. Those lighter components of the feed, together with hydrocarbon reaction products of like volatility and gases including hydrogen, hydrogen sulfide and ammonia pass into plenum space 12 from which they are distributed into the bottom of catalyst bed 13. The volatile hydrocarbons are there hydrotreated to provide premium products which pass through bubble caps or the like on trap tray 20. A liquid fraction collected on tray 20 is desulfurized distillate fuel withdrawn by line 21 as a product of the process. A portion of that product is passed through heat exchanger 22 and pump 23 for return to catalyst bed 13 where it serves as reflux and for temperature control.

Vapors and gases rising from trap tray 20 may be passed through a final catalytic treatment in catalyst bed 24 at the lowest temperature of the column. Heavy ends of the vapors are there condensed in part for return to trap tray 20 and the motor fuel and other light premium product components receive a final hydrotreating. The treated and fractionated light product vapor is withdrawn at line 25, condensed in heat exchanger 26 and passed to accumulator 27. A stream of hydrogen admixed with such reaction products as gaseous hydrocarbons, hydrogen sulfide and ammonia is discharged at line 28 for recovery, treating and recycle of hydrogen and recovery of by-products in the usual manner. Light liquid product discharged by line 29 will contain components of motor gasoline, jet fuel, kerosene and the like for blending with other refinery streams, possibly after further treatment such as reforming of the gasoline fraction to improve octane number. Pump 30 and inlet 31 serve for recycle of a light liquid product stream as reflux to the top of reactor/fractionator 11.

The system shown in FIG. 1 represents the best mode now contemplated for commercial application of the invention, based on small scale laboratory runs. It is recognized that scaling up from the laboratory runs presently to be described involve chemical engineering problems such as column flooding and changes in mass flow due to chemical reactions which may require departures from the arrangement herewith illustrated to attain optimal commercial use of the technique.

The experimental laboratory runs are concerned with a modified type of operation in which only two product streams are obtained, a bottoms fraction of desulfurized residual fuel and an overhead fraction containing distillate fuel, naphtha and lighter, a type of operation also contemplated as commercially advantageous. The equipment used was a laboratory microreactor for high pressure reaction. That reactor is set up for conduct of reactions under isothermal conditions, for which purpose it is enclosed by electrical heaters. To achieve the desired temperature gradient, the heater was turned off immediately above an intermediate feed point provided by modification of the reactor. The reactor column was packed with about 50 cc of commercial hydrocracker first stage catalyst of nickel-tungsten on silica-alumina. The catalyst was disposed approximately 55% above and 45% below the oil feed inlet. This arrangement is indicated graphically in FIG. 2 which also shows the temperature profile in the reactor on running a typical gas oil for hydroprocessing/distillation in accordance with the invention. In the gas oil run, feed was supplied at 10 cc per hour for liquid hourly space velocity (LHSV) of 0.2 with respect to total catalyst in the reactor, 750 psig. with hydrogen to the bottom of the reactor at a rate of 4000 standard cubic feet per barrel of charge (SCF/B). Maximum temperature above the feed inlet was 667° F., below feed inlet 775° F. Overhead from the reactor was condensed and separated from a gas phase. Nature of the feed and products is set out in Table 1.

TABLE 1

| Wt % | Gas | Overhead Distillate | Bottom | Feed |
|---|---|---|---|---|
| $C_1$ | 0.6 | | | — |
| $C_2$ | 0.5 | | | — |
| $C_3$ | 0.9 | — | — | — |
| $C_4$ | 1.1 | 0.1 | — | — |
| $C_5$ | 0.6 | 0.5 | 0.1 | — |
| $C_6$-330° F. | 0.4 | 6.3 | 1.2 | 0.5 |
| 330°–420° F. | | 5.1 | 2.0 | 2.5 |
| 420°–650° F. | | 10.4 | 11.3 | 15.5 |
| 550°–650° F. | | 3.7 | 20.0 | 24.5 |
| 650°–800° F. | | 0.3 | 24.5 | 33.0 |
| 800+ °F. | | — | 10.5 | 24.0 |
| | 4.0 | 26.4 | 69.6 | 100 |

Two runs were conducted for hydroprocessing/distillation of atmospheric resid from Arab Light crude. Both were conducted at 1000 psig. and LHSV of 0.2 with temperature above feed inlet at 800° F. and below at 850° F. Results of a run at a hydrogen rate of 4000 SCF/B are shown in Table 2. At 8000 SCF/B, results were as shown in Table 3.

TABLE 2

| Wt % | Gas | Overhead Distillate | Bottom | Feed |
|---|---|---|---|---|
| $C_1$ | 1.6 | | | |
| $C_2$ | 1.7 | | | |
| $C_3$ | 2.7 | 0.4 | | |
| $C_4$ | 2.9 | 1.4 | | |
| $C_5$-420° F. | 2.9 | 31.4 | | |
| 420°-650° F. | — | 37.4 | — | 15.9 |
| 650+ °F. | — | 0.4 | 17.2 | 84.1 |
| | 11.8 | 71.0 | 17.2 | 100 |
| Product Quality | | | | |
| Ni ppm | | 0 | 0.7 | 5 |
| V ppm | | 0 | 2.8 | 18 |
| S wt % | | 0 | 0.9 | 2.5 |
| N wt % | | 0.01 | 0.07 | 0.12 |

TABLE 3

| Wt % | Gas | Overhead Distillate | Bottom | Feed |
|---|---|---|---|---|
| $C_1$ | 1.1 | | | |
| $C_2$ | 1.1 | | | |
| $C_3$ | 1.4 | — | | |
| $C_4$ | 1.2 | 0.1 | | |
| $C_5$-420° F. | 0.8 | 20.1 | | — |
| 420°-650° F. | 0.5 | 47.0 | | 15.9 |
| 650°-800° F. | — | 17.7 | — | 23.5 |
| 800+ °F. | — | 5.3 | 3.7 | 60.6 |
| | 6.1 | 90.2 | 3.7 | 100 |

The results in Table 3 are particularly interesting in demonstration that it is feasible to distill up to 800° F. end point material under pressure with hydrogen as the stripping gas simultaneously with hydrocracking and hydrotreating.

In a distillation (fractionation) column, a vapor liquid equilibrium exists between the vapor phase and the liquid phase throughout the length of the column, both above and below the feed plate. The temperature of the column increases from the top to the bottom. These conditions are fully integrated with the catalytic processing in the instant invention, i.e., the lower boiling fraction receives the milder catalytic processing, while the higher boiling fraction receives the more severe processing. The partial pressure of hydrogen also increases from top to bottom with the most refractory high boiling fraction exposed to the highest partial pressure of hydrogen.

Compared to conventional vacuum distillation, several new features in the combined process are significant:

1. The distillation is carried out under high pressure. The function of vacuum is replaced by a hydrogen containing gas stream. The fact that the distillation function can be successfully carried out under high pressure is unexpected.

2. Catalytic hydroprocessing increases the quantity of lower boiling overhead products and decreases the amount of 1000° F.+ fraction originally present in the feedstock, so that the diameter of the column above and below the feedplate may be proportionately larger and smaller than that of the respective sections of a conventional column, having regard to volume occupied by packing, etc.

3. The thermal energy required to operate a vaccum still is greatly reduced in the combined process, because hydroprocessing is exothermic, the heat generated by the reaction of hydrogen with the feedstock facilitates the distillation process. Liquid reflux to the column is obtained by exchanging the heat with the fresh feed in the reflux condensers.

In general, processing of gas oils and resids may be conducted over catalysts of Group VIII metals such as cobalt, nickel, palladium, alone or in combinations with other such metals or molybdenum or tungsten on a suitable support which may be alumina, silica-alumina, titania-zirconia or the like. Pressures will range between about 300 and 3000 psig. at LHSV of 0.25 to 2. Bottom temperatures of the reactor/fractionator may be 600°-1000° F. and top temperatures in the range of 450°-850° F. Hydrogen to hydrocarbon ratios may range upwardly from 500 SCF/B to 25,000 SCF/B. The degree of hydrocracking desired can have a profound influence on choice of catalyst. For deep hydrocracking, the catalyst should provide strong hydrogenation and acid functions, such as palladium or zeolite ZSM-5 or zeolite Y as at least a portion of the catalyst fill.

Catalysts which contain zeolite ZSM-5 are particularly advantageous in upgrading of whole waxy crudes because of the capacity of that zeolite for selective hydrocracking of long chain normal paraffins.

In addition to the variety of catalyst already described, other catalysts such as manganese nodules, $AlCl_3$, $ZnCl_2$, etc., particularly useful for demetalation and heavy oil processing may be slurried with the feedstock and fed to the column. In another embodiment, the catalyst bed below the feed plate may be designed as a slowly moving bed so that fresh catalyst may be added and deactivated catalyst removed from the column either continuously or intermittently.

We claim:

1. A process for simultaneous distillation and hydrocracking of heavy hydrocarbon feeds stocks boiling predominantly above about 650° F. which comprises introducing said stocks to an intermediate point as the sole hydrocarbon feed in a vertical column of a hydrocracking catalyst on a porous solid support, introducing hydrogen to said column below said intermediate point for flow upwardly in said column at a rate sufficient to act as a stripping medium between about 500 and 25,000 standard cubic feet of hydrogen per barrel of said feedstock, maintaining a temperature gradient in said column from a maximum below said intermediate point by reason of exothermic heat of hydrocracking to a minimum thereabove whereby higher rolling constituents of said stocks are caused to flow downwardly as liquid counter-current to said hydrogen at hydrocracking conditions of 300 to 3000 psig, LHSV of 0.25 to 2 and temperature of 600°-1000° F. while lighter constituents and hydrocracking conversion products are caused to flow upwardly as vapor concurrent with said hydrogen resulting in fractional distillation of feed stocks and conversion products in said column, withdrawing liquid hydrocarbon products from the bottom of said column, withdrawing distillate hydrocarbon product vapor from the top of said column, condensing said product vapor and recycling such condensed liquid product as reflux to the top of said column for temperature control.

2. A process according to claim 1 wherein said feed stock is a gas oil.

3. A process according to claim 1 wherein said feed stock is residual fraction from distillation of a petroliferous crude.

4. A process according to claim 1 wherein said feed stock is a crude petroleum.

5. A process according to claim 4 wherein said feed stock is a waxy crude petroleum.

6. A process according to claim 1 wherein a disposable catalyst is suspended in the hydrocarbon feed stock introduced to said intermediate point.

7. A process according to claim 1 wherein that portion of said hydroprocessing catalyst on a porous solid support below said intermediate point is a downwardly moving bed maintained by adding catalyst to the top of such portion below the intermediate point and by withdrawing catalyst from the bottom of such portion.

8. A process according to claim 1 wherein a portion of said liquid hydrocarbon products withdrawn from the bottom of said column is recycled through a heat exchanger controlled to maintain desired temperature in said catalyst below said intermediate point and introduced to said catalyst below said intermediate point.

* * * * *